United States Patent [19]
Cleveland

[11] Patent Number: 4,874,025
[45] Date of Patent: Oct. 17, 1989

[54] MITER SAW UTILITY STAND

[76] Inventor: Gary D. Cleveland, 1014 June St., New Bedford, Mass. 02745

[21] Appl. No.: 194,196

[22] Filed: May 16, 1988

[51] Int. Cl.⁴ .................. B25H 1/16; B25H 1/14; B25H 1/06
[52] U.S. Cl. .................. 144/287; 83/648; 144/286 R; 269/901; 108/28; 108/92; 108/101
[58] Field of Search .......... 83/648; 144/285, 286 R, 144/286 A, 287; 269/901; 108/48, 28, 33, 79, 92, 97, 101

[56] References Cited

U.S. PATENT DOCUMENTS

| | | | |
|---|---|---|---|
| 2,555,217 | 5/1951 | Young | 144/286 R |
| 3,342,226 | 9/1967 | Marcoux et al. | 144/286 R |
| 3,734,151 | 5/1973 | Skripsky . | |
| 4,068,551 | 1/1978 | Kreitz . | |
| 4,105,055 | 8/1978 | Brenta . | |
| 4,106,381 | 8/1978 | Kreitz | 83/648 |
| 4,114,665 | 9/1978 | Decker . | |
| 4,186,784 | 2/1980 | Stone . | |
| 4,335,765 | 6/1982 | Murphy . | |
| 4,349,945 | 9/1982 | Fox | 144/1 R |
| 4,561,336 | 12/1985 | Davis | 144/286 R |

FOREIGN PATENT DOCUMENTS

| | | | |
|---|---|---|---|
| 2116550 | 10/1972 | Fed. Rep. of Germany | 144/1.6 |
| 639529 | 3/1928 | France | 144/1 R |
| 49941 | 12/1909 | Switzerland | 144/1 R |

Primary Examiner—W. Donald Bray
Attorney, Agent, or Firm—Fleit, Jacobson, Cohn, Price, Holman & Stern

[57] ABSTRACT

A miter saw utility stand having a saw table top upon which the miter saw is to be mounted. Located in a plane extending above the saw table top and parallel to the saw table top surface are a pair of wings which extend longitudinally and are used to support the workpiece to be cut. Each wing has an upstanding fence along one edge to enable the user to securely brace the workpiece to be cut. In one embodiment, the structure supporting the wings precludes the wings from being moved into overlying relation to the table surface. In another embodiment, the wings can be adjusted laterally inwardly of the table top surface into abutting engagement with the wings and the support structure therefor being constructed to enable vertical and horizontal adjustment of the wings, removal of the wings and addition of similar wings to extend the workpiece supporting surface.

16 Claims, 4 Drawing Sheets

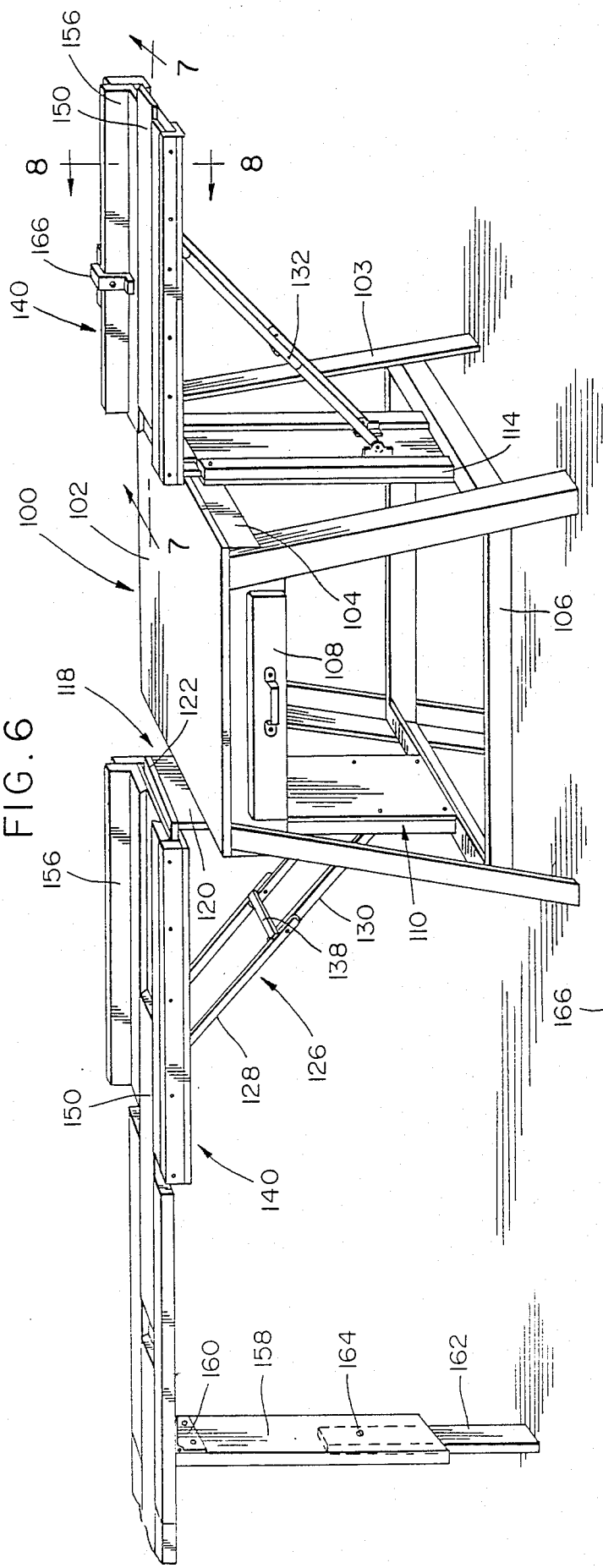
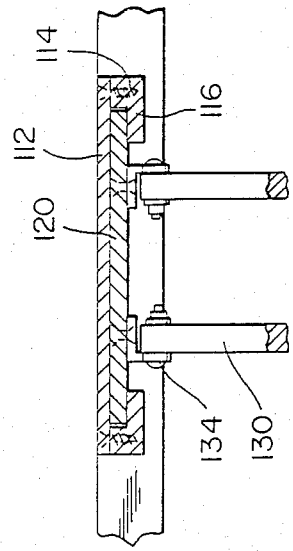
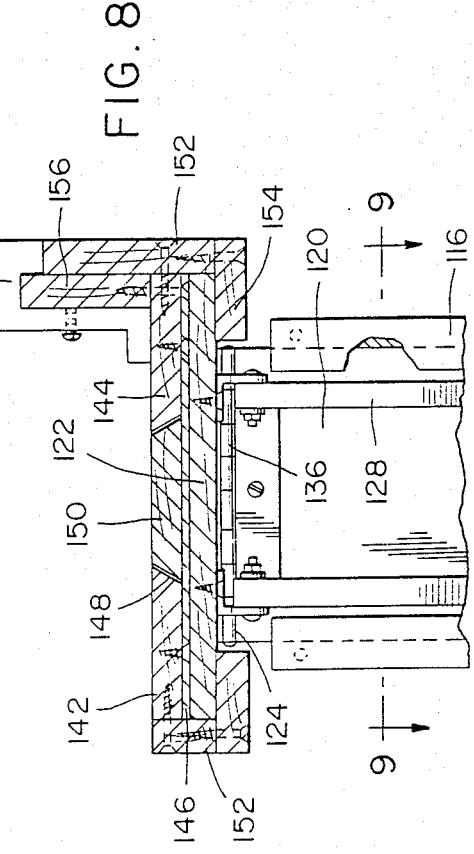

MITER SAW UTILITY STAND

BACKGROUND OF THE INVENTION

1. FIELD OF THE INVENTION

The present invention relates to a bench for wood working, and more particularly to a miter saw utility stand.

2. DESCRIPTION OF PRIOR ART

When a contractor, carpenter, cabinet maker or homeowner is working with wood, it is often necessary to cut wood pieces to exacting specifications. One such way to do this is by utilizing a miter saw. By utilizing a miter saw, cuts such as 45° angles, and the like, can be accurately made through the wood.

When utilizing a miter saw, an apparatus usually has to be built to accommodate the saw and the wood workpiece being cut. For example, the woodworker typically sets up a temporary free-standing bench. This usually consists of a set of carpenter's horses with plywood on top. The horses and plywood are built up to the height of the table upon which the miter saw is contained. After the set-up has been completed, the woodworker may proceed with the sawing process.

This set-up has severe drawbacks. First, the "impromptu" arrangement is typically assembled and dismantled on a daily or job-to-job basis. Further, once the stand is designed and assembled, it is not easy to move. Accordingly, a lot of time is wasted in walking from the work area to where the saw and stand are.

Alternatively, many people do not bother with any kind of stand. Rather, they rely on another person to hold and support the piece of wood being cut. This procedure suffers from a number of defects. First, this arrangement is not cost productive as it requires the use of two individuals to perform the operation. Further, without a secure support biased against the wood being cut, the probability of a clean cut is minimized.

Further, others choose to use a miter saw without any kind of stand or a second person to hold the wood being cut. This too suffers from a great number of defects. First, reaching out to support the wood with one arm while aligning a cut mark to the saw blade with the other arm is time consuming, awkward, and typically ends up with an inaccurate cut which must be redone. Further, the chances of a physical injury caused by the set up are at a maximum.

Accordingly, it would be desirable to utilize a miter saw utility stand which is both portable and safe to use. Further, it would be desirable to develop a stand which is compact, safe, requires only one person for using it and is extremely versatile.

Although several prior art devices have been produced to meet some of these criteria, they have not satisfied all of them.

For example, U.S. Pat. No. 4,561,336 to Davis discloses a portable universal miter saw workbench. The workbench includes a power tool supporting site and a workpiece supporting surface. The power tool support site and workpiece supporting surface are aligned vertically relative to each other. Both the supporting site and the supporting surface are constructed of two frames which are adjustable in a substantially horizontal direction to accept any size miter saw on the power tool supporting site. Further, the ends of the workpiece supporting surface may be longitudinally adjusted to accommodate a workpiece of various sizes.

Although the Davis work bench is constructed to enable the miter saw and the workpiece being cut to be aligned horizontally and vertically, there is no means provided for supporting the workpiece placed onto the workbench in a lateral direction. Accordingly, by using the Davis workbench, a clean cut cannot be guaranteed, particularly if only one person is operating the miter saw.

U.S. Pat. Nos. 3,734,151 to Skripsky and 3,335,765 to Murphy disclose portable workbenches. Although the work benches are designed so that saws, such as miter saws can be mounted into the bench, these benches suffer from the defect that they are not vertically and horizontally adjustable and as such, the user is restricted to work within the physical parameters set by the work bench.

Thus, a need exists for a utility stand for a miter saw which is portable, may be easily used by one person, has excellent versatility, and is safe to use.

SUMMARY OF THE INVENTION

The present invention provides a miter saw utility stand which is compact and easy to use. The stand is particularly characterized by having a saw table top upon which the miter saw is to be mounted. Located in a plane extending above and parallel to the saw table top surface are a pair of wings which extend longitudinally and are used to accommodate the workpiece to be cut. In one form of the invention, the wings are designed so that they do not overlap the vertical space located directly above the saw table top. The wings are further characterized by having fence portions mounted perpendicular to their length to enable the user to securely brace the workpiece to be cut directly against the fence portions. Further, the center portions of the wings are lengthwise adjustable so that the length of the wings can be extended to accommodate almost any sized workpiece. The wings are mounted to a first set of adjustable sidewalls by hinges and are connected to a second set of adjustable sidewalls by a collapsible brace so that when the stand is not in use, the brace can be collapsed to cause the wings to rest against the first and second set of sidewalls. Both sets of the adjustable sidewalls have transverse openings contained therein to allow vertical movement of the wings relative to the saw table top. The first set of sidewalls surround the transverse sides of the table top but do not touch the table top edges. The saw table top and sidewalls are mounted onto four legs having feet to enable the utility stand to be a free standing apparatus. The stand also optionally includes a drawer and a writing table both located directly below the saw table top to add further versatility to the utility stand.

In another form of the invention, the wings can be adjusted inwardly into overlying relation to the table top as well as outwardly with the wings including a wing extension that can be used for supporting workpieces and also for connecting an additional wing or wings for extending the effective length of the workpiece supporting surface formed by the wings. Each of the wings is supported by a foldable brace having one leg slidably connected to a wing and a vertical leg slidably and adjustably mounted in a vertically disposed pocket mounted on the stand.

It is an object of the present invention to provide a miter saw utility stand which may be easily used by one person to ensure safe and accurate cuts.

A further object of the present invention is to provide a miter saw utility stand which is portable, sturdy and easily collapsible.

An additional object of the present invention is to provide a miter saw utility stand which can accommodate variable lengths of pieces to be cut.

A further object of the present invention is to provide a miter saw utility stand which contains a drawer and a writing table to increase its versatility.

A further object of the present invention is to provide a miter saw utility stand which is of simple construction and made of inexpensive materials.

It is an additional object of the present invention to provide a utility stand which may be easily modified so that a router or saber saw can be used with the utility stand.

Other objects and features of the present invention will become apparent to those skilled in the art as the disclosure is made in the following description of a preferred embodiment of the present invention, as illustrated in the accompanying sheets of drawings.

BRIEF DESCRIPTION OF THE DRAWINGS

FIG. 6 is a perspective view of another form of the invention.

FIG. 8 is a transverse, sectional view taken substantially upon a plane passing along section 8—8 on FIG. 6 illustrating the specific structure of the wing.

FIG. 9 is a transverse, sectional view taken substantially upon a plane passing along section 9—9 on FIG. 8 illustrating the details of construction of the pocket and brace.

DETAILED DESCRIPTION OF THE INVENTION

Figure 1:
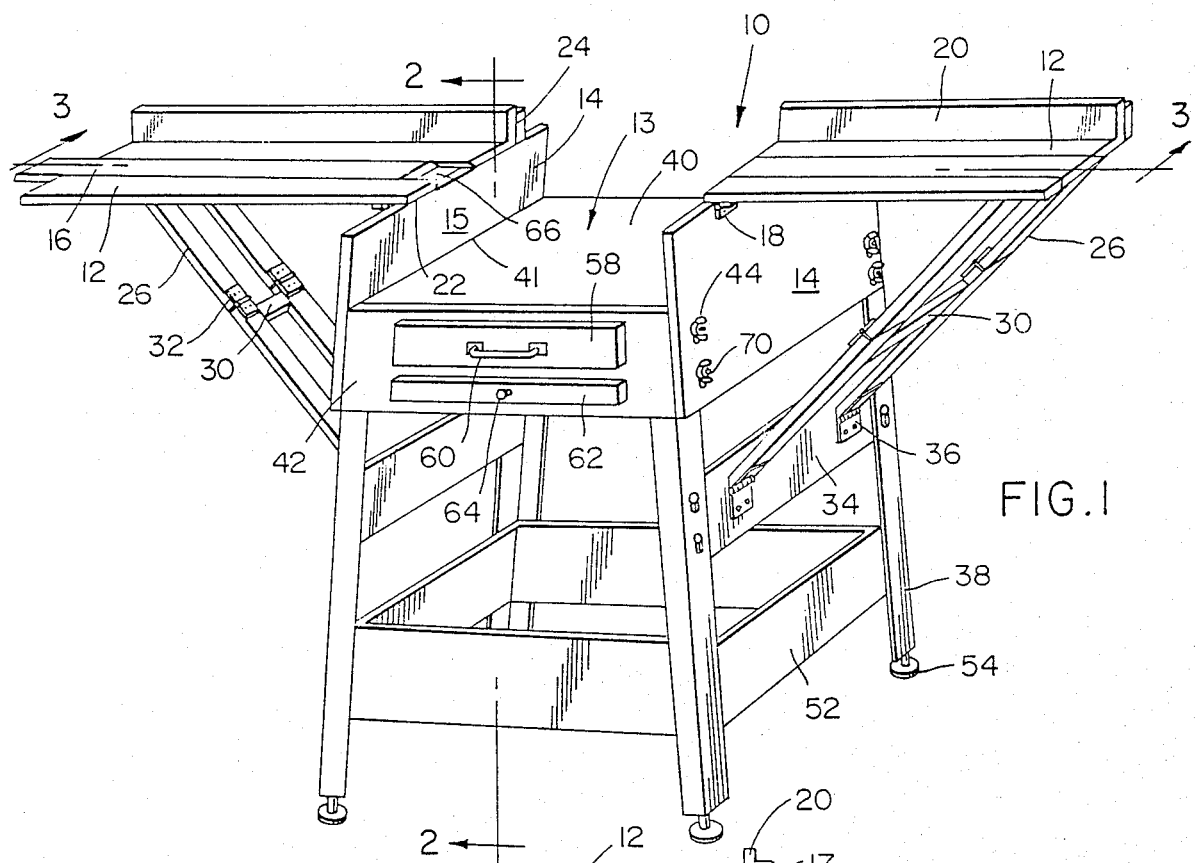
FIG. 1 is a perspective view of one form of miter saw utility stand.

In describing embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Referring now to the drawings, and more particularly to FIGS. 1-5, the miter saw utility stand is designated as 10 in FIG. 1. Generally, stand 10 includes two longitudinal wings 12. The wings 12 are longitudinally spaced apart from each other to create an opening 13. The center transverse portion of each of wings 12 contains a slidable insert wing extension 16 which may be longitudinally extended from wing 12. When insert wing extension 16 is extended, an opening 66 in the center portion of wing 12 is created.

Figure 4:
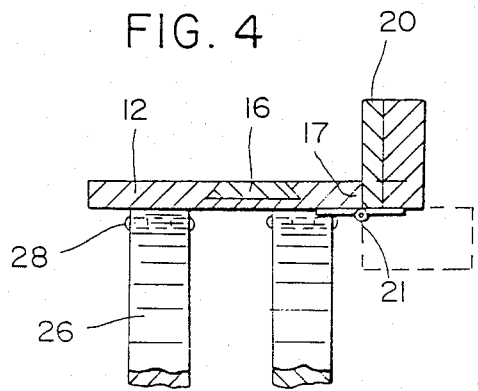
FIG. 4 is a sectional view showing the connection of a fence to a wing.

Connected to a longitudinal side edge 17 of each wing 12 is a fence 20 which is mounted perpendicular to and flush with the length of each wing 12. The connection of each fence 20 to each wing 12 is best shown in FIG. 4. As shown in FIG. 4, hinge 21 connects a fence 20 to a wing 12. When not in use or when it is not desired for the fence 20 to be in an upright position, horizontal pressure is applied to fence 20 to act against hinge 21 to cause fence 20 to be positioned below wing 12.

Wings 12 and fences 20 are mounted to adjustable sidewalls 14 by hinges 18 such that the transverse edges 22 of wings 12 and edges 24 of fence 20 rest flush with walls 14. Mounted at the opposite end of wings 12 from hinge 18 is the upper portion of one of two braces 26, which is connected to wing 12 by hinge 28. Each brace 26 has located at its central portion hinge 32. Located directly below hinge 32 is cross piece 30. The lower portion of each brace 26, which is not connected to wing 12, is connected to adjustable sidewalls 34 by means of hinges 36.

Adjustable sidewalls 14 and adjustable sidewalls 34 are connected to legs 38. As illustrated, the connection of legs 38 to walls 14 and 34 is accomplished by wing nuts 44 and bolts 70 and bolts 48 and wing nuts 72 respectively.

Located parallel to, and below wings 12 is saw table top 40. The transverse sides of saw table top 40 are surrounded by sidewalls 14 such that edges 41 of table top 40 align with, but are not attached to, face 15 of sidewall 14. The width of table top 40 is approximately equivalent to the width of opening 13.

Integrally connected to the lower surface of table top 40 are the tops of legs 38. Mounted between left and right adjustable sidewalls 14 along faces 15 and integrally connected with table top 40 and two of the four legs 38 is front wall 42. Front wall 42 contains openings (not pictured) to accommodate drawer 58 and drawing board 62. These components aid the user by enabling the storage of elements such as a framing square and combination square holder, pencils, and the like, and provide the user with a surface to write on.

Figure 2:
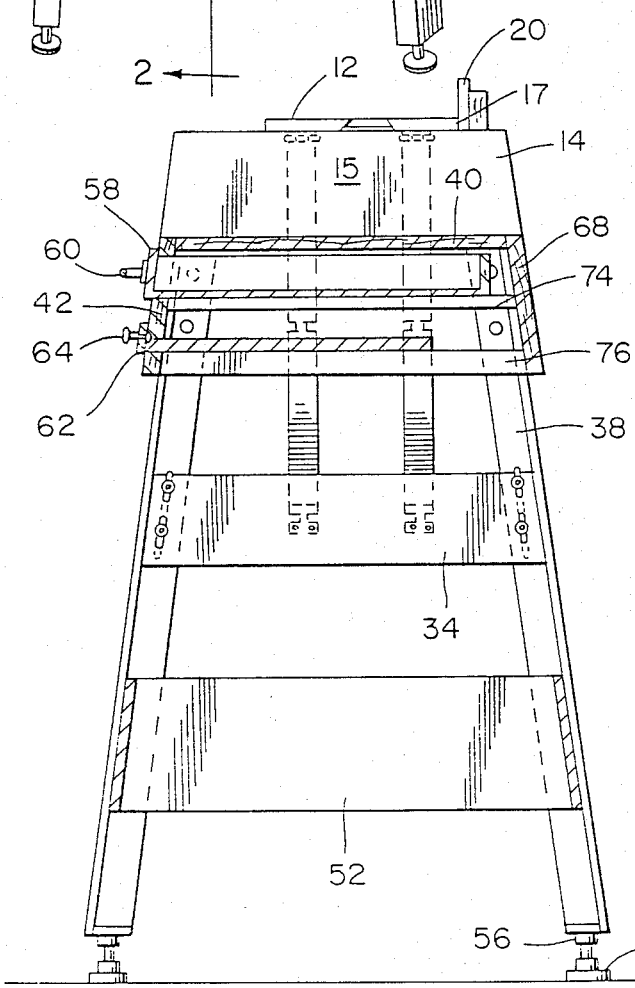
FIG. 2 is a sectional view taken along line 2—2 of FIG. 1.
Figure 3:
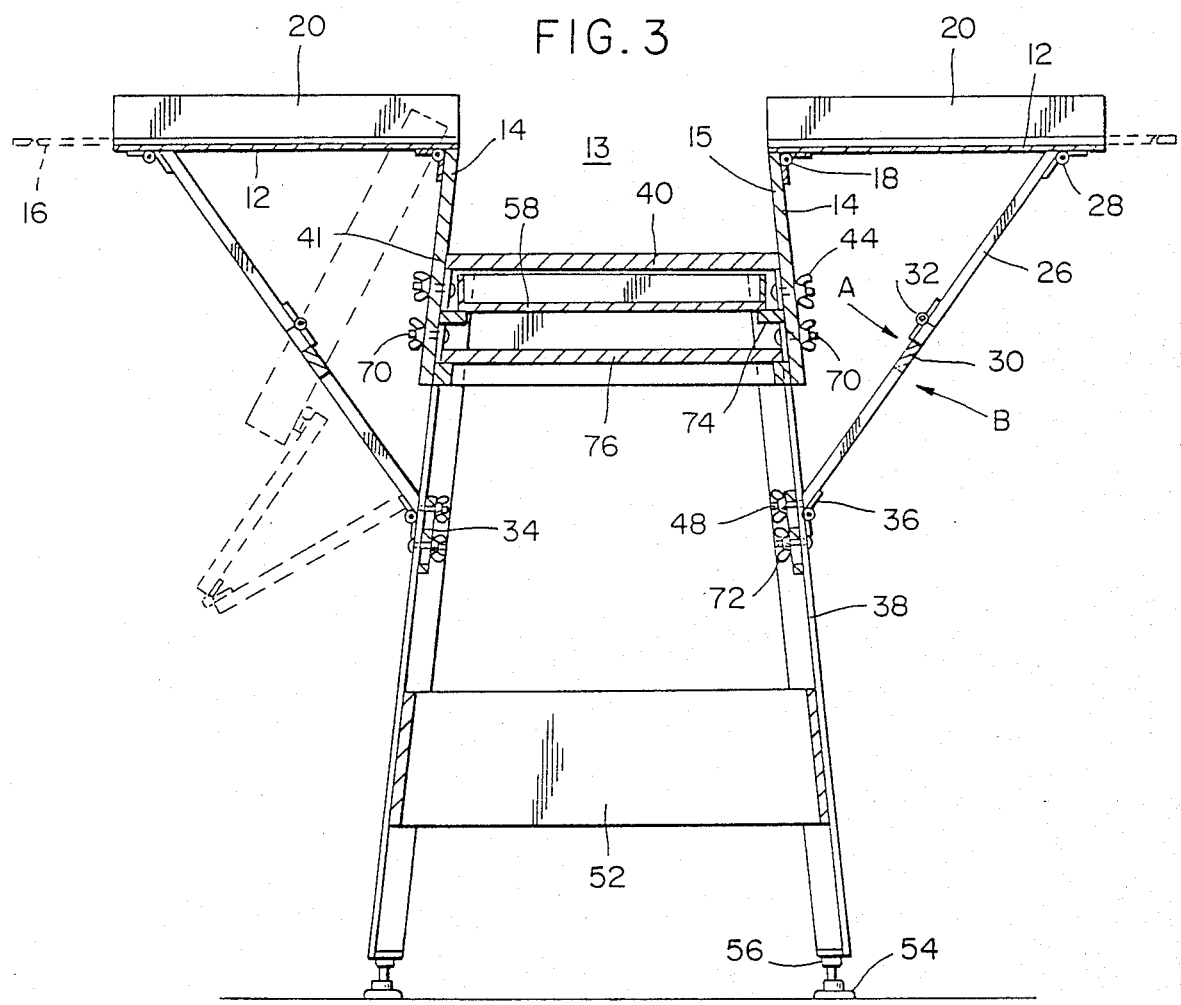
FIG. 3 is a sectional view taken along line 3—3 of FIG. 1.

As best shown in FIG. 3, drawer 58, having handle 60 on its front face, rests on ledge 74. Drawing board 62, having handle 64, rests on support wall 76 which is also integrally connected to legs 38. To complete the connection between table top 40, all four legs 38 and front wall 42, rear wall 68 is connected to table top 40 and two of the four legs 38 as is shown in FIG. 2. The height of rear wall 68 is equivalent to the height of front wall 42 and its upper edge rests flush with the top surface of table top 40.

Integrally connected to the lower portions of legs 38 are support walls 52. Located at the bottom of legs 38 are openings 56 into which feet 54 are inserted. Feet 54 are adjustable to enable stand 10 to be adjusted to appropriate heights.

Figure 5:
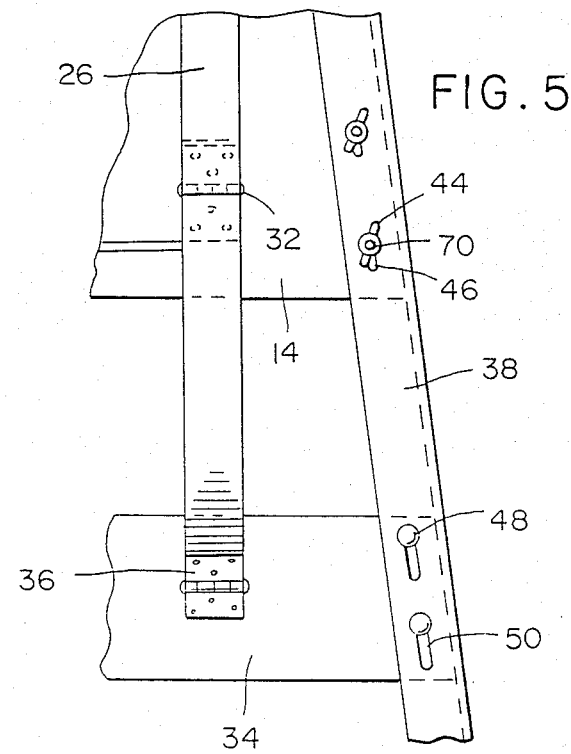
FIG. 5 is a fragmental, elevational view of the miter saw utility stand showing a portion of the hinged brace, one leg, and adjustable sidewalls.

The vertical adjustability of adjustable walls 14 and 34 is best shown in FIG. 5. Referring to FIG. 5, wing nuts 44 and bolts 70 are mounted through leg 38 and wall 14 into longitudinal slots 46. Longitudinal slots 46 are sized so that bolts 70 may move vertically through slot 46. Similarly, bolts 48 and wing nuts 72 are mounted through legs 38 and adjustable walls 34 into longitudinal slots 50. As is the case with bolts 70, bolts 48 may be adjusted vertically through slots 50.

To adjust walls 14 and 34, and hence wings 12 and braces 26 relative to table top 40, wing nuts 44 and 72 are loosened and walls 14 and 34 are vertically moved by the vertical movement of bolts 70 and 48 through slots 46 and 50 respectively. When the desired height of adjustable walls 14 relative to table top 40 is attained, wing nuts 44 and 72 are tightened.

Having described the above stand, its use in connection with a miter saw will be described. A miter saw, not pictured, is placed upon table top 14. Thereafter, a workpiece, not pictured, is placed onto wings 12 such that a portion of the piece lies directly above the miter saw in opening 13. The piece is held onto wings 12 such that one of its longitudinal edges is braced against fences 20. If the length of the piece of the wood is greater than the length of wings 12, insert wings 16 may be extended to accommodate the full length of the piece. If the height of the piece and the height of the miter saw blade are such that a smooth cut can be made, the saw is actuated and the cut is made.

If, however, adjustment needs to be made to vertically align the saw blade with the height of the workpiece, as described above with reference to FIG. 5, wing nuts 44 and 72 are loosened to obtain the proper location of bolts 70 and 48 within slots 46 and 50 respectively. Once the desired height between wings 12 and top 40 is obtained, wing nuts 44 and 72 are tightened. The miter saw blade is then actuated and the workpiece is cut.

After the workpiece has been cut and removed from stand 10, wings 12 can be compacted to case stand 10 to be more easily movable. To compact wings 12, as best shown in FIG. 3, pressure is exerted on hinges 32 in the direction indicated by arrow A to cause the upper and lower portions of braces 26 to converge towards each other around hinges 32. The ends of braces 26 connected to wings 12 pivot around hinges 28 to cause the upper portion of braces 26 to be in a compressed state. Similarly, the ends of braces 26 connected to sidewalls 34 pivot around hinges 36 to cause the lower portion of braces 26 to be in a compressed state. As shown in phantom in FIG. 3, fence 20 and brace 26 compress so that wings 12 and 16 and brace 26 completely rest at the side of legs 38. After each brace 26 has been compacted, stand 10 can be easily transported.

Conversely, to set up stand 10 from its compacted state, wings 12 are extended away from sidewalls 14 and 34 by the action on hinges 18 and 36 respectively. Pressure is exerted on crosspiece 30 in the direction indicated by arrow B to cause hinges 32 to lock. Once hinges 32 have locked, stand 10 is ready to accommodate a miter saw and a workpiece.

In this embodiment of the invention, the elements of the utility stand are made of metal having the integrally connected parts welded together. However, other materials may be used within the scope of this invention, such as plastic. If plastic materials are used, other means, such as adhesives may be used to integrally connect the various elements with the stand.

In this embodiment of the invention, walls 14 and 34 are able to undergo vertical motion by the action of bolts and wing nuts through vertical slots. However, it is envisioned that other vertically adjustable devices such as thumbscrews, for example may be used to move and secure walls 14 and 34 to legs 38.

In this embodiment of the invention, fences 20 are designed to rest perpendicular against wings 12. However, if another type of saw is used, such as a router or saber saw, fences 20 may be removed by unscrewing hinges 21. The router or saber saw may then be mounted to the underside of one of the wings 12.

In this embodiment of the invention, the height of legs 38 is approximately 30". However, other heights for legs 38 are envisioned within the scope of the invention.

In this embodiment of the invention, the dimensions of table top 40 are approximately 16" by 22". However, it is envisioned within the scope of the invention that other sized table tops may be utilized.

In this embodiment of the invention, the total longitudinal span created by wings 12 and opening 13 is approximately 5½'. Further, the length of each extension wing 16 is approximately 2'. This enables stand 10 to have a total length of 9½'. However, it is envisioned that other length wings may be utilized within the scope of the invention.

In this embodiment of the invention, the height of walls 14 with respect to table top 40 are adjustable so that the top edge of wall 14 will be anywhere from 2" to 5" above the surface of top 40. However, other adjustable heights besides the 2" to 5" range are contemplated within the scope of this invention.

Referring now specifically to the embodiment of the invention illustrated in FIGS. 6–9, the utility stand is generally designated by reference numeral 100 and includes a horizontally disposed table top surface 102 that is preferably square or rectangular in configuration and of any desired size. The table top surface 102 is supported by a plurality of downwardly extending legs 102 secured to a peripheral frame 104 positioned below the table top surface 102. The legs are interconnected by braces 106 and the frame 104 may be provided with a storage drawer 108. These components are rigidly and securely fixed together by using standard construction techniques depending upon the materials used with these components being constructed of wood, metal, plastic or any other suitable material normally used for constructing a rigid and sturdy stand.

Figure 7:
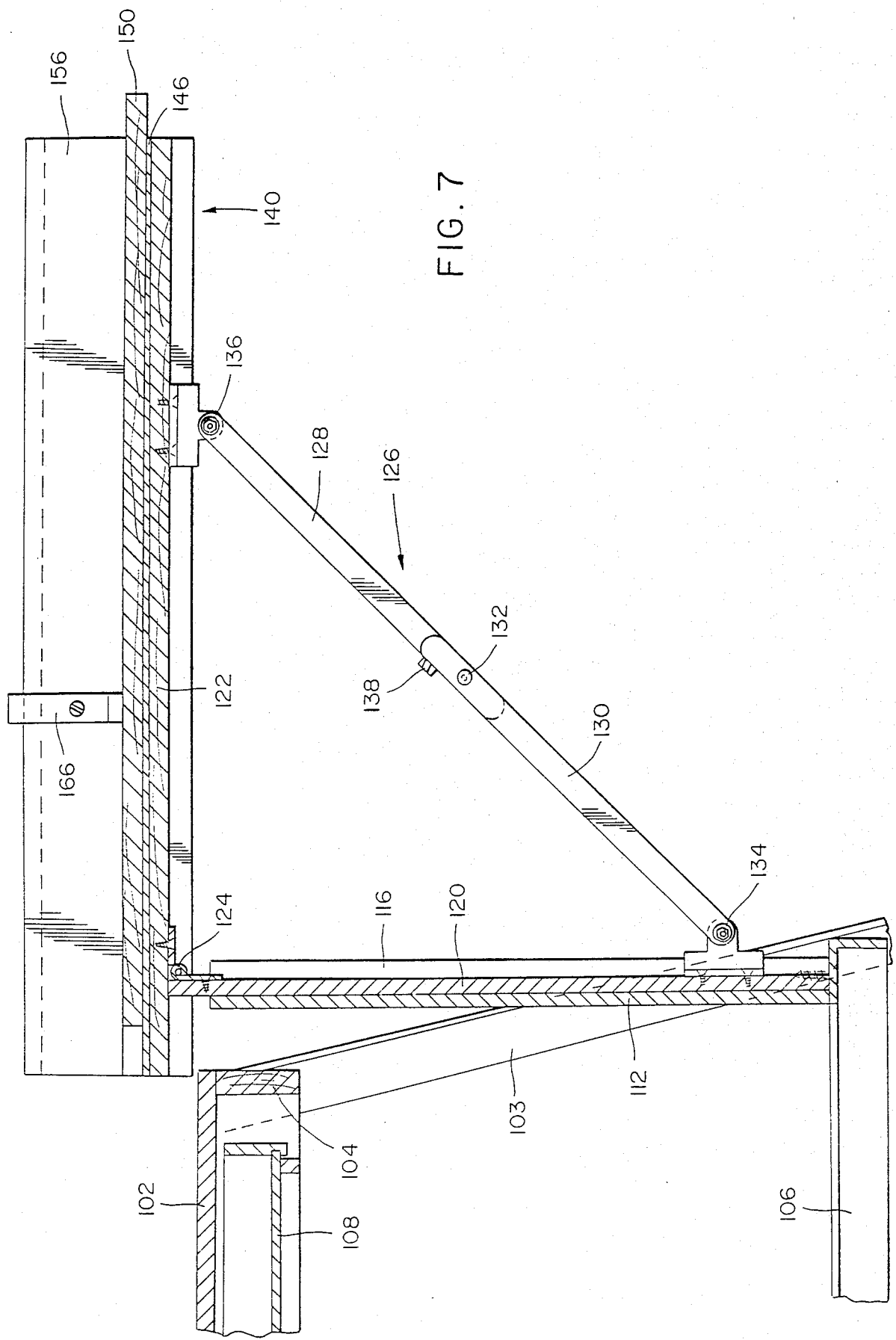
FIG. 7 is a longitudinal, sectional view taken along section line 7—7 on FIG. 6 illustrating the structure of the wing, brace and pocket.

A vertically disposed pocket 110 is mounted vertically along each side of the stand 100 with each pocket including an inner panel 112, side edge members 114 and inwardly extending flanges 116, all of which are vertically elongated and fixedly secured to the stand in any suitable manner with the top edge of the pocket 110 being located slightly below the table top surface 102 as illustrated in FIGS. 6 and 7 with the specific structural details of the pocket being best illustrated in FIG. 9.

Slidably and removably supported in each pocket 110 is a foldable brace 118 which includes a vertically disposed leg 120 and a horizontally disposed leg 122 which are in the form of panels having a rectangular cross sectional area with the legs 120 and 122 being hingedly connected by a hinge 124 which enables the two legs to be pivoted towards each other. A knee brace 126 interconnects the lower end of the vertical leg 120 and the outer end of the horizontal leg 122 with the knee brace including two rigid components 128 and 130 pivotally connected by hinge structure 132 with the member 130 being connected to the leg 120 by hinge 134 and member 128 being connected to the horizontal leg 122 by hinge structure 136. A transverse stop member 138 is secured to the member 130 in spaced relation to the hinge 132 so that the members 128 and 130 which form the knee brace 126 can be folded inwardly with the hinge axis 132 being moved towards the hinge 124 thus enabling the horizontal leg 122 to fold toward the vertical leg 120. The leg 122 also can be swung to horizontal position as the knee brace 126 is moved from its inwardly folded position to a straight line position until the stop member 138 engages the upper surface of the member 128 to lock the knee brace 126 in operative position to support the leg 122 in perpendicular relation to the leg 120 with the knee brace 126 securely locking the brace 118 to retain the legs in perpendicular relation when the knee brace members 128 and 130 are in alignment with each other with the stop member 138 engaged with the inner edge of the member or members 128.

As illustrated, the vertical leg 120 is guided by the pocket 110 so that the brace 118 can be vertically adjustable and completely removed from the pocket with the vertical leg 120 being disposed closely adjacent the side edges of the table top surface 102 when installed in the guideway formed by the pocket 110. Any suitable lock screws such as thumb screws may be used to secure the leg 120 in vertically adjusted position and enable removal of the brace 118 so that it can be easily stored or utilized with other machines or apparatuses having a similar pocket associated therewith.

Each of the braces 118 supports a wing 140 having a pair of elongated, horizontally disposed, longitudinally extending and transversely spaced parallel members 142 and 144 which are interconnected by a supporting or mending plate 146 that underlies and is secured to the members 142 and 144 to maintain them in rigid relation. The facing edges of the members 142 and 144 are inclined at 148 and converge upwardly and inwardly to slidingly receive a wing extension 150 which has correspondingly inclined side edges so that the wing extension 150 will be retained between the members 142 and 144 with the bottom surface slidable on the mending plate 146. The wing extension 150 corresponds in length to the members 142 and 144 and when the ends of the wing extension 150 and the members 142 and 144 are in alignment, the top surfaces of the members 142 and 144 and the wing extension 150 are disposed in the same horizontal plane to provide a supporting surface for a workpiece. The members 142 and 144 include side members 152 and inturned flanges 154 to define facing channels below the mending plate 146 thereby forming a guide slidably receiving the horizontal leg 122 of the brace 118 as illustrated in FIGS. 6–8. The leg 122 is closely received in the channel shaped guide formed in the bottom of the wing 140 with the wing 140 being longitudinally adjustable in both directions so that the inner ends of the wings 140 may be moved inwardly into a position overlying the table top surface and the inner ends of the wings 140 may actually be brought into abutting engagement if desired. Also, the wings 140 can be moved longitudinally outwardly and the wing extensions 150 can be moved and adjusted longitudinally within the limits of the length of these components with it being necessary that several inches of the components be retained in telescopic assembled relation. Suitable set screws, thumb screws and the like can be used to secure the adjustable and removable components in adjustable and assembled relation. One longitudinal side edge of each wing 140 is provided with an upstanding fence 156 which is perpendicular to the work supporting surface defined by the wing 140 with the fence 156 being alignable with the miter saw fence.

FIG. 6 illustrates the manner in which the wing extension 150 can be used to connect additional wings 140' to the wing 140 which is attached to the brace 118. The wing 140' is identical to the wing 140 except that a support leg 158 is supported at the outer end thereof by a hinge 160 which enables the leg 158 to fold up to a position alongside the undersurface of the wing 140'. The lower end of the leg 158 is provided with a telescopic extension 162 secured in adjusted position by a thumb screw 164 or the like in order to effectively support the outer end of the wing 140' from a supporting surface which may be uneven terrain at a building site. Additional wings 140' may be connected in longitudinal alignment in the same manner. Usually, the wings 140' do not require the use of a fence such as fence 156 but, if desired, the wings 140' also can be provided with a fence. Also mounted on the fence is a longitudinally adjustable stop 166 secured in place by a thumb screw or the like which can be used to limit the positioning of a workpiece when desired.

In this embodiment of the invention, the wings 140 can be easily adjusted vertically and locked at any point from a position in alignment with the table top surface 102 to a position up to 12" above the table top surface while maintaining an exact parallel relation to the table top surface with only a single thumb screw or stop required to secure the wings in adjusted position which allows the wings to be adjusted so that they can be properly positioned with respect to substantially any commercially available miter saw on the market. Also, the wings 140 easily move in and out and can be easily locked in any adjusted position from abutting against each other at the center of the table top surface to a position flush with the outside edges of the table top surface thereby allowing the wings 140 to adjust to effectively receive and accommodate any width miter saw that is on the market.

The wings can be easily folded down to a stored position and can be easily pulled out and removed from the stand to be carried to a desired location, stored or the like and the wings can just as easily be put back on the stand. Likewise, the braces 118 can be easily removed and put back on the stand. The workpiece stop 166 facilitates repetitive or multiple cuts of the workpiece at the same length thereby eliminating the necessity of alignment of the workpiece with a mark. The use of the wing extensions 150 extends the length of the supporting surface formed by the wings and also enables effective attachment and alignment of auxiliary wings 140'. The wings 140 can be used when separated from the stand such as with a table saw, radial arm saw and similar tools having a relatively short workpiece supporting surface. By using the wing or wings, the workpiece supporting surface of such a saw or tool can be effectively extended thereby enabling more effective support of a workpiece especially if the workpiece is relatively long.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:
1. A miter saw utility stand comprising:
   a pair of wing means for supporting a workpiece, each of said wing means extending longitudinally and having an opening separating them;
   a pair of fence means for bracing the workpiece, each of said fence means being mounted perpendicular to and flush with a longitudinal edge of a respective one of said wing means;

a pair of first adjustable sidewall means for adjusting the height of said wing means, said pair of first adjustable sidewall means being connected to the transverse edges of said pair of wing means;

table top means for holding the saw, said table top means being located below and parallel to a plane created by the length of said pair of wing means, the width of said table top means being about equal to the length of the opening separating said pair of wing means;

a pair of brace means for supporting said pair of wing means, one end of each of said brace means being mounted to a respective one of said wing means;

a pair of second adjustable sidewall means for adjusting the height of said pair of brace means and said pair of wing means relative to said table top means, each of said second adjustable sidewall means being connected to a respective one of said brace means; and leg means for supporting said pair of first and second adjustable sidewall means and said table top means, said leg means being connected to said pair of first and second adjustable sidewall means and said table top means.

2. The utility stand according to claim 1 wherein each of said wing means additionally comprises a longitudinal insert second wing means for extending the length of each of said wing means.

3. The utility stand according to claim 1 wherein each of said brace means comprises hinge means located at about the center of each of said brace means and wherein said pair of wing means are connected to said first adjustable sidewall means by hinge means to enable said pair of wing means and said pair of brace means to collapse against said pair of first and second adjustable sidewall means when said stand is not in use.

4. The utility stand according to claim 1 wherein said stand further comprises drawer means for holding woodworking supplies.

5. The utility stand according to claim 1 wherein said stand further comprises writing table means for providing a surface to write on.

6. The utility stand according to claim 1 wherein each of said first and second adjustable sidewall means comprises vertical longitudinal slots having contained therein a nut and a bolt to enable vertical movement of said first and second adjustable sidewall means.

7. A stand for a tool having a workpiece engaging means for performing a work operation on the workpiece, said stand comprising support means for the tool, workpiece supporting means extending laterally of the tool support means for supporting a workpiece during the work operation and means supporting the workpiece supporting means from the stand to enable adjustment of the workpiece supporting means in relation to the tool support means for orienting the workpiece in optimum relation to the workpiece engaging means on the tool, said tool support means being a generally horizontally disposed surface at the upper end of the stand, said workpiece supporting means including a laterally extending wing having an upper supporting surface extending laterally of the tool supporting surface, said means supporting the workpiece supporting means including means enabling vertical adjustment and horizontal adjustment of the workpiece supporting means.

8. The structure as defined in claim 7 wherein said means enabling adjustment of the workpiece supporting means includes a brace having a vertical leg and a horizontal leg, means supporting the vertical leg of the brace from the stand for vertical adjustment and removal, means on the workpiece supporting means slidably and removably engaged with the horizontal leg of the brace to enable lateral adjustment of the workpiece supporting means and removal of the workpiece supporting means from the horizontal leg of the brace.

9. The structure as defined in claim 8 wherein said workpiece supporting means includes a fence along one edge thereof for positioning a workpiece thereon and adjustable stop means mounted on the fence to enable multiple work operations of the same character to be performed.

10. The structure as defined in claim 8 wherein said means supporting the vertical leg of the brace for vertical adjustment includes a vertically disposed pocket mounted on the stand including a vertical guide slidably and removably receiving the vertical leg of the brace and means securing the vertical leg of the brace adjustably in the guide.

11. The structure as defined in claim 8 wherein said workpiece supporting means includes a longitudinally extendable workpiece supporting ember for extending the length of the workpiece supporting means, and additional workpiece supporting means attachable to said extension for providing additional extension of the workpiece supporting means.

12. The structure as defined in claim 7 wherein said means enabling vertical adjustment of the workpiece supporting means includes means enabling vertical removal of the workpiece supporting means from the stand thereby enabling the workpiece supporting means to be removed from the stand, said means enabling horizontal adjustment of the workpiece supporting means including means enabling movement of the workpiece supporting means into at least partial overlying relation to the tool support means.

13. For use in combination with a supporting stand for a tool while performing a work operation on a workpiece, a wing extending laterally from the stand including a workpiece supporting surface, means adjustably supporting the wing solely from the stand for varying the relationship of the workpiece supporting surface to the stand and tool, said means supporting the wing including means enabling vertical adjustment, horizontal adjustment and removal of the wing.

14. The structure as defined in claim 13 wherein said means supporting the wing includes a foldable brace having a vertical leg attached to the stand and a horizontal leg attached to the wing with the legs being pivotally connected to each other and maintained in perpendicular relation by a knee brace to enable the legs to be pivoted to a collapsed position adjacent each other and extended to a perpendicular position to support the wing from the stand.

15. The structure as defined in claim 11 wherein said means adjustably supporting the wing solely from the stand includes means enabling removal of the wing from the stand and folding movement of the wing from a generally horizontal position to a generally vertical position alongside the stand.

16. The structure as defined in claim 15 wherein said means adjustably supporting the wing includes means enabling vertical adjustment of the wing and horizontal adjustment of the wing in relation to the supporting stand.

* * * * *